United States Patent
Ziegenbein et al.

[11] Patent Number: 5,351,539
[45] Date of Patent: Oct. 4, 1994

[54] SENSOR FOR MEASURING ACCELERATION AND TILT WITH A BUBBLE LEVEL

[75] Inventors: Botho Ziegenbein, Reutlingen; Ulrich Kippelt, Eningen; Uwe Foell, Gomaringen, all of Fed. Rep. of Germany

[73] Assignee: Robert Bosch GmbH, Stuttgart, Fed. Rep. of Germany

[21] Appl. No.: 839,757
[22] PCT Filed: Nov. 13, 1990
[86] PCT No.: PCT/DE90/00862
  § 371 Date: May 26, 1992
  § 102(e) Date: May 26, 1992
[87] PCT Pub. No.: WO90/08492
  PCT Pub. Date: Jun. 13, 1991

[30] Foreign Application Priority Data
Nov. 29, 1989 [DE] Fed. Rep. of Germany ....... 3939410

[51] Int. Cl.⁵ .......................... G01P 15/12; G01C 9/06
[52] U.S. Cl. .................. 73/500; 73/516 LM; 33/366
[58] Field of Search ............ 73/500, 516 LM; 33/366; 338/22 SD, 27, 44

[56] References Cited
U.S. PATENT DOCUMENTS

| | | | |
|---|---|---|---|
| 3,114,209 | 12/1963 | Foody | 33/366 |
| 4,359,717 | 11/1982 | Huber | 340/63 |
| 4,583,296 | 4/1986 | Dell'Acqua | 33/366 |
| 4,771,271 | 9/1988 | Zainini-Fisher | 338/22 SD |
| 5,153,556 | 10/1992 | Hecht et al. | 338/25 |

FOREIGN PATENT DOCUMENTS
WO87-05569 9/1987 PCT Int'l Appl. .

Primary Examiner—John E. Chapman
Attorney, Agent, or Firm—Frishauf, Holtz, Goodman & Woodward

[57] ABSTRACT

A sensor is proposed which is used for detecting the acceleration and the inclination of a movable object (10), in particular a motor vehicle. A bubble level (11) is fixed on the object (10). The bubble level (11) comprises a housing (12), a liquid (16) contained in the housing (12) and a gas bubble (17) contained in the housing (12). The liquid (16) and the gas bubble (17) together completely fill the hollow chamber (15) enclosed by the housing (12), so that the gas bubble (17) is not completely enclosed by the liquid (16), but lies against the interior of the housing (12), so that the surface separating the liquid and the gas pushes against the interior of the housing (12). The gas bubble (17) is in an initial position inside the housing (12) when the acceleration and the inclination of the bubble level (11) are equal to zero or their effects are mutually canceled out. On the inside of the housing (12), within that area over which the gas bubble (17) extends in the said initial position, an electrically heatable, temperature-sensitive electrical circuit element (RS) is disposed, which is a component of an evaluation circuit, which generates an output signal ($U_D$) which is a function of the acceleration and the inclination of the bubble level (11).

15 Claims, 2 Drawing Sheets

SENSOR FOR MEASURING ACCELERATION AND TILT WITH A BUBBLE LEVEL

FIELD OF THE INVENTION

The invention relates to a sensor for measuring tilt with a bubble level.

BACKGROUND OF THE INVENTION HEINTZ, KONIG & PACHNER/BOSCH, publ. 24 Sep. 1987, A sensor of this type is already known from WO 87/05569, HEINTZ, KONIG & PACHNER/BOSCH, publ. 24 Sep. 1987, where an optical method based on diffraction and reflection is used for detecting the acceleration and the inclination of a motor vehicle. In this method, a beam of light emanating from an emitter is diffracted or reflected at the surface separating a liquid and a gas bubble that falls on a receiver if the gas bubble contained in the housing is in its initial position. However if, because of acceleration or inclination of the motor vehicle, the gas bubble is deflected from its initial position, the light beam is diffracted or reflected in a different direction at the surface separating a liquid and the gas bubble, and no longer falls on the receiver, so that a signal is triggered by the optical device.

This sensor has the disadvantage that the means required for realizing the optical method (emitter, receiver, etc.) entail a relatively high expenditure of mechanical, optical and electric parts.

SUMMARY OF THE INVENTION

In contrast thereto, the sensor in accordance with the invention a temperature-sensitive element producing an output signal which is a function of degree of coverage of the element by a bubble floating in a liquid-filled chamber of the sensor.

DRAWINGS

The invention will be described in detail by means of the drawings.

They show:

FIG. 1, a schematic cross section of an exemplary embodiment of a sensor in accordance with the invention having a bubble level, FIG. 2, the electrical block diagram of a possible evaluation circuit of the sensor in accordance with claim 1, FIG. 3, a plan view of the cover plate of the housing for the bubble level in accordance with FIG. 1, formed as a hybrid plate, together with the circuit elements of the evaluation circuit installed thereupon, FIG. 4 in section, an electrically heatable, temperature-sensitive, electric circuit element formed according to bubble technology perpendicular to the surface of the cover plate formed as a hybrid plate.

DETAILED DESCRIPTION OF THE EXEMPLARY EMBODIMENT

Figure 1:
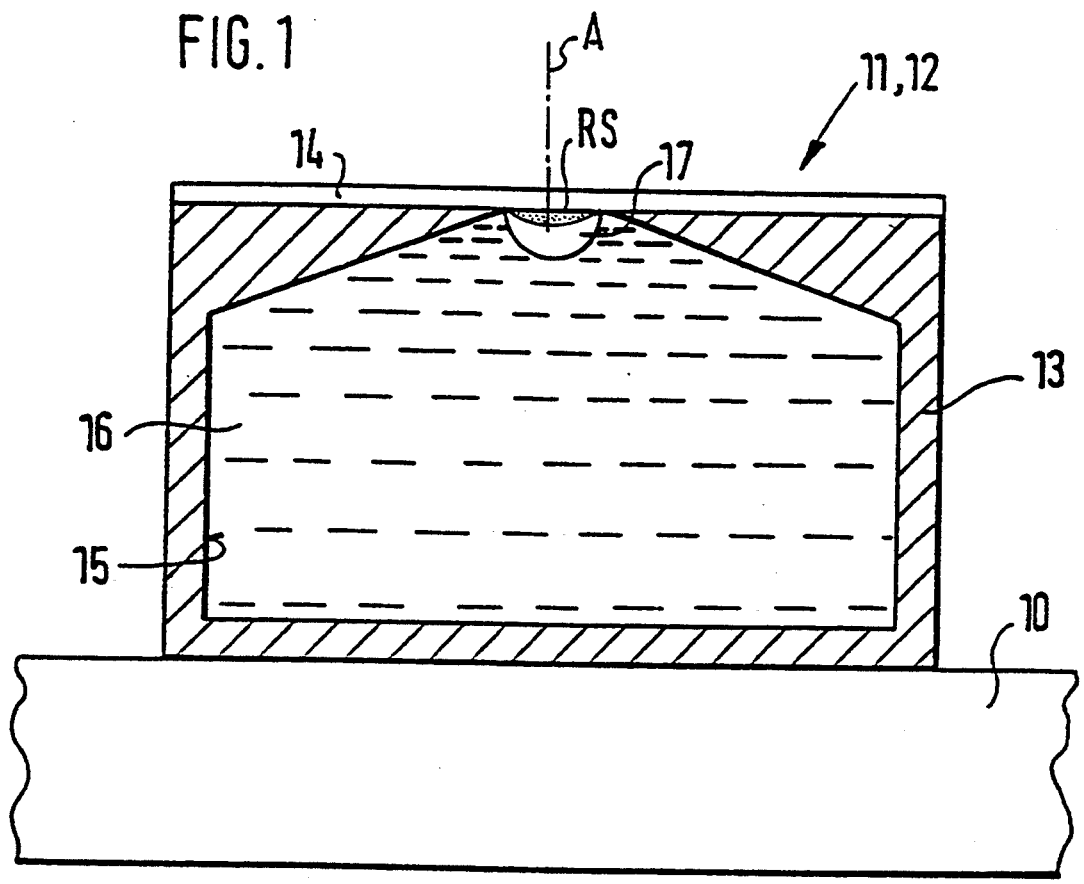

The structure of an exemplary embodiment of an acceleration and inclination sensor in accordance with the invention is schematically illustrated in FIG. 1.

A bubble level 11 is secured on a movable object 10, for example a motor vehicle, the acceleration and inclination of which is intended to be detected. It comprises a housing 12, consisting of a lower housing body 13 and a cover plate 14. The cover plate 14 has been fixed on the lower housing body 13 in such a way that the housing 12 is completely sealed. The housing 12 encloses a rotation-symmetrically hollow chamber 15 which tapers conically in the direction of the cover plate 14. In this case, the upper portion of the hollow chamber 15 has the shape of a truncated cone, where the gradient of slope of the truncated cone is preferably 21°. A liquid 16 and an air bubble 17 are contained in the hollow chamber 15 enclosed by the housing 12, the liquid 16 and the air bubble 17 together completely filling up the hollow chamber 15. In its initial position shown in FIG. 1, the air bubble 17 rests against the cover plate 14 and extends concentrically around the axis A of the rotation-symmetrically shaped hollow chamber 15.

The cover plate 14 is formed as a hybrid plate and is equipped on one side with electronic components.

As shown in the sectional view of FIG. 1, an electrical circuit element RS in the form of an ohmic resistance element has been installed on the side of the surface of the cover plate 14 oriented towards the lower body housing 13.

Figure 2:
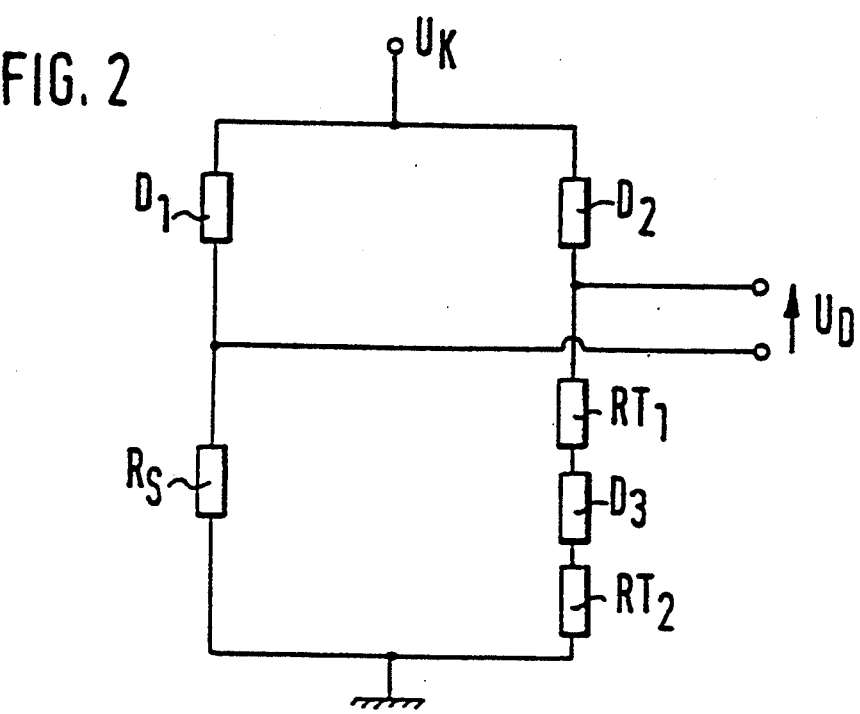

As shown in FIG. 2, the electric circuit element RS in the form of an ohmic resistance element is a part of a Wheatstone bridge circuit with resistors RS, $RT_1$, $RT_2$, $D_1$, $D_2$ and $D_3$, forming the evaluation circuit of the sensor in accordance with FIG. 1. A constant reference direct voltage $U_K$ is applied to a first bridge diagonal of the Wheatstone bridge circuit. The output signal $U_D$ is picked up at the other, second bridge diagonal.

Figure 3:
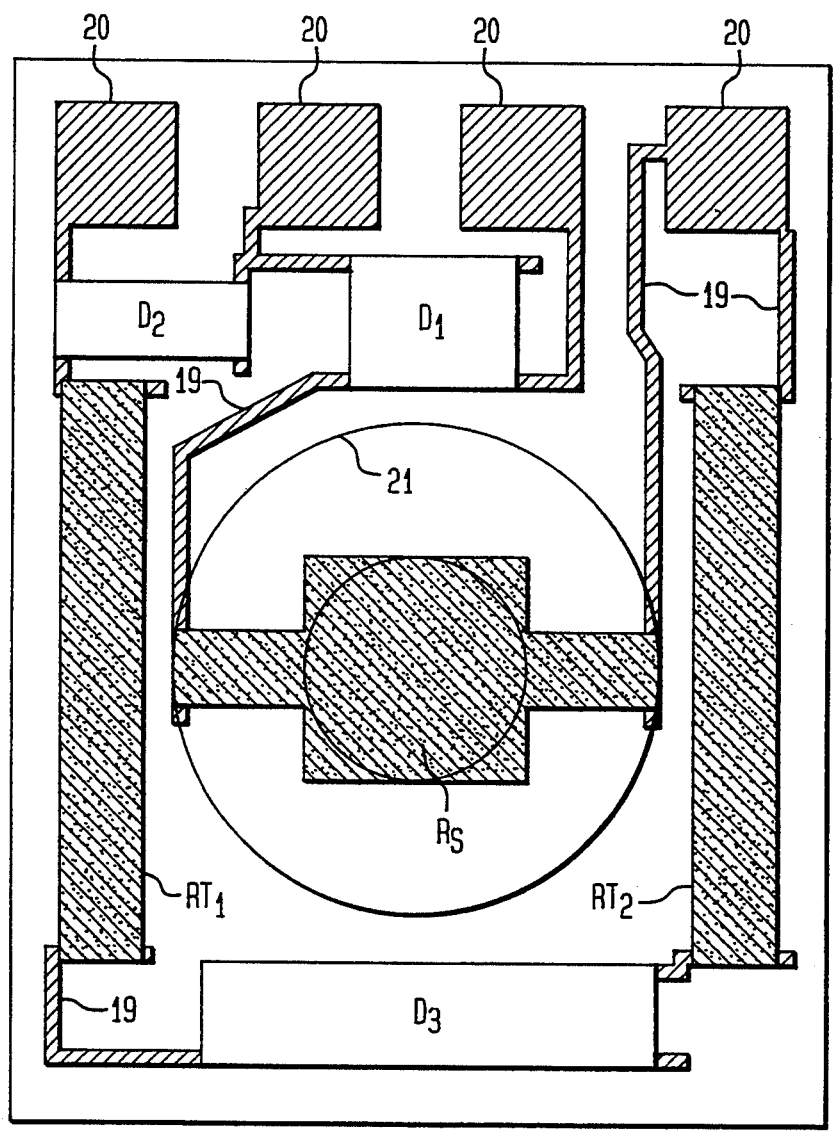

FIG. 3 shows the cover plate 14, in the form of a hybrid plate, in a plan view of the particular surface side on which the electrical circuit element RS has been installed. The circuit element RS and the resistors $RT_1$, $RT_2$, $D_1$, $D_2$ and $D_3$ of the evaluation circuit have been manufactured in accordance with thick-film technology. The resistors $D_1$, $D_2$, $D_3$ can be used as sensor resistors for the ambient temperature. The resistor $D_3$ is used in this case for setting the temperature coefficient of the series circuit of the resistors $RT_1$, $D_3$, $RT_2$. The strip conductors have been designated by 19, the connecting spots for the exterior connection of the Wheatstone bridge circuit by 20.

Figure 4:
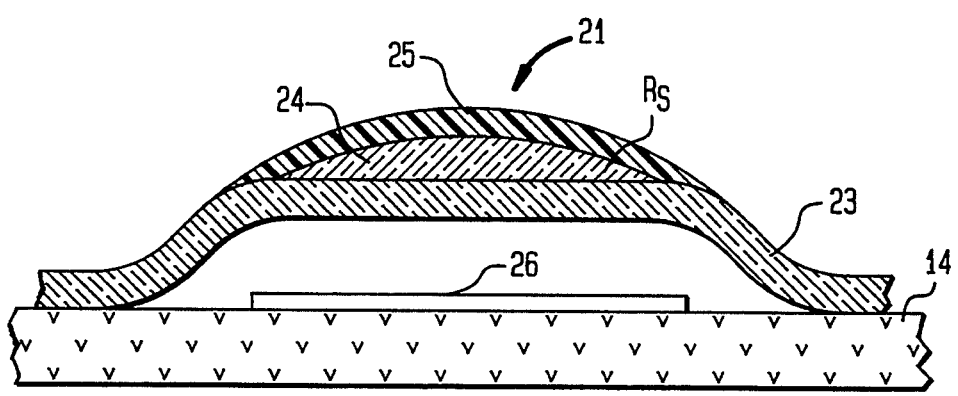

FIG. 4 shows how the electrically heatable, temperature-sensitive electrical circuit element RS can be installed in an advantageous manner on the hybrid plate in accordance with bubble technology. A bubble 21 in the shape of a dome, made of a ceramic material, preferably a glass-ceramic material, is applied to the hybrid plate 14. The resistor element RS, formed as a film resistor, is housed in the bubble 21. The bubble 21 contains a diaphragm 23 produced in thick-film technology, on which the resistor element RS is disposed, an intermediate layer 24 made of glass being located between the diaphragm 23 and the resistor element RS. The resistor element RS is covered with a protective layer 25 with good heat-conducting properties, consisting of glass.

The following process is followed when producing the resistor element 25 formed in bubble technology:

The process starts by printing a pedestal 26 consisting of a thick-film paste on the hybrid plate 14 at the place where the bubble 21 is to be attached, which is then dried and fired in air. Subsequently, a layer of carbon paste, not shown in the drawings, is printed on the pedestal 26, is then dried and fired in nitrogen. Essentially only the volatile components escape during the firing of the carbon paste in nitrogen, but the carbon remains as a solid component. Then a layer consisting of a ceramic thick-film paste is printed on the carbon layer and a rim area surrounding it, and the system is subsequently fired in nitrogen and then in air. During firing of the system in air, the carbon layer burns off completely and the layer applied to the carbon layer arches to form a diaphragm. Because the diaphragm still is too porous and too thin in this process stage, it is subsequently reinforced by embedding glass in it and compressed. The diaphragm or membrane 23 shown in FIG. 4 is created in this manner.

A glass layer 24 is now printed on the diaphragm 23, which is used as the base for the resistor element RS in the form of a film resistor to be applied to it, and which is intended to improve the adhesion and homogeneity of this resistor element. However, with a suitable choice of the material for the diaphragm 23, the glass layer 24 can even be omitted.

A platinum-containing paste is used to make the resistor element RS. The protective layer 25 is then applied. The protective layer 25 protects the resistor element RS and the strip conductors, not shown in FIG. 4, from dirt and corrosion. The protective layer 25 is designed in such a way that good thermal coupling of the temperature of the two media 16 and 17 to the temperature of the resistor element RS is assured.

The function of the sensor in accordance with FIGS. 1 to 4 is as follows:

The temperature-sensitive electrical circuit element RS is heated to a set or predetermined temperature because of the constant reference direct voltage UK applied to the first bridge diagonal of the Wheatstone bridge circuit, at which the temperature-sensitive electrical circuit element RS takes on a set resistance value. If the sensor is accelerated and/or inclined, the air bubble 17 migrates to the edge of the housing 12 and the liquid 16 flows around the temperature-sensitive electrical circuit element RS. Because of this, the temperature of the temperature-sensitive electrical circuit element RS is lowered and, with it, its ohmic resistance value. The output signal $U_D$ at the second bridge diagonal of the Wheatstone bridge circuit changes, which indicates the acceleration and/or inclination of the sensor or the movable object.

The particular advantage of the sensor in accordance with the invention consists in that no abrasion or spalling occurs during constant oscillation and only negligible hysteresis, and that the sensor can be produced in a cost-effective manner in hybrid technology.

It is furthermore advantageous that the sensor can take omnidirectional measurements because of the rotation-symmetrical structure of the bubble level and that the liquid does not have to be transparent. The sensor is insensitive to vertical acceleration. Its sensitivity or reactivity can be changed over a wide range by means of the shaping of the upper interior of the housing. Damping or timing properties of the sensor can be set by means of the type of fluid and the flow cross section (distance between bottom and cover).

The resistors RS, $RT_1$ and $RT_2$ made of platinum have a temperature coefficient TK of 3400 ppm/K, the thick-film resistors $D_1$, $D_2$ and $D_3$ a temperature coefficient TK of 50 ppm/K.

We claim:

1. A sensor for detecting the acceleration and the inclination of a movable object (10), with the aid of a bubble level (11) secured to the movable object (10), comprising a housing (12), a liquid (16) partially filling the housing (12), while leaving a gas bubble (17) in a portion of the housing, where the liquid (16) and the gas bubble (17) together completely fill a hollow chamber (15) defined by the housing (12), so that the gas bubble is not completely enclosed by the liquid (16), but lies against the interior of the housing (12), so that an interface separating the liquid and the gas contacts the interior of the housing (12) and where the gas bubble (17) is in an initial position inside the housing (12) when the acceleration and the inclination of the bubble level (11) are equal to zero or their effects cancel each other, where furthermore the sensor has an electrically heatable, temperature-sensitive electrical circuit element (RS) and the electrical circuit element (RS) is a component of an evaluation circuit, which generates an output signal ($U_D$) which is a function of the acceleration and the inclination of the bubble level (11), and wherein, on the inside of the housing (12), within that area over which the gas bubble (17) extends in said initial position, the housing (12) consists of a lower housing body (13) and a cover plate (14), the electrical circuit element (RS) is disposed on a surface side of the cover plate (14) oriented towards the lower housing body (13), and the circuit element (RS) is formed on the cover plate (14) by thick-film production techniques.

2. A sensor in accordance with claim 1, further comprising means for heating the electrical circuit element is heatable by causing an electric current to flow through the electrical circuit element (RS).

3. A sensor in accordance with claim 1,
wherein the electrical circuit element (RS) is an ohmic resistance element.

4. A sensor in accordance with claim 3,
wherein the ohmic resistance element (RS) is a film resistance element.

5. A sensor in accordance with claim 4,
wherein the ohmic resistance element (RS) is housed in a bubble (21) consisting of a glass-ceramic material, which is arched on the inside of the housing (12), on the surface side of the cover plate (14) oriented towards the lower housing body (13).

6. A sensor in accordance with claim 5,
wherein the bubble (21) contains a diaphragm (23) produced in thick-film technique, on which the film resistance element (RS) is disposed.

7. A sensor in accordance with claim 1,
characterized in that
further electric circuit elements ($RT_1$, $RT_2$, $D_1$, $D_2$, $D_3$) are applied to the cover plate (14) formed as a hybrid plate, which are components of the evaluation circuit.

8. A sensor in accordance with claim 7,
wherein said further electric circuit elements ($RT_1$, $RT_2$, $D_1$, $D_2$, $D_3$) are disposed on the surface side of the cover plate (14) oriented towards the lower housing body (13).

9. A sensor in accordance with claim 1,
wherein
the hollow chamber (15) enclosed by the housing (12) has the shape of a truncated cone, at least in the vicinity of the initial position of the gas bubble (17).

10. A sensor in accordance with claim 9, wherein the gradient of slope of the truncated cone is 21°.

11. A sensor in accordance with claim 2, characterized in that
further electric circuit elements ($RT_1$, $RT_2$, $D_1$, $D_2$, $D_3$) are applied to the cover plate (14) formed as a hybrid plate, which are components of the evaluation circuit.

12. A sensor in accordance with claim 3, characterized in that
further electric circuit elements ($RT_1$, $RT_2$, $D_1$, $D_2$, $D_3$) are applied to the cover plate (14) formed as a hybrid plate, which are components of the evaluation circuit.

13. A sensor in accordance with claim 4, characterized in that
further electric circuit elements ($RT_1$, $RT_2$, $D_1$, $D_2$, $D_3$) are applied to the cover plate (14) formed as a hybrid plate, which are components of the evaluation circuit.

14. A sensor in accordance with claim 5, characterized in that
further electric circuit elements ($RT_1$, $RT_2$, $D_1$, $D_2$, $D_3$) are applied to the cover plate (14) formed as a hybrid plate, which are components of the evaluation circuit.

15. A sensor in accordance with claim 6, characterized in that
further electric circuit elements ($RT_1$, $RT_2$, $D_1$, $D_2$, $D_3$) are applied to the cover plate (14) formed as a hybrid plate, which are components of the evaluation circuit.

* * * * *